US010544901B2

(12) United States Patent
Newhouse et al.

(10) Patent No.: US 10,544,901 B2
(45) Date of Patent: Jan. 28, 2020

(54) PRESSURE VESSEL VENTED BOSS WITH SINTERED METAL PLUG

(71) Applicant: Hexagon Technology AS, Alesund (NO)

(72) Inventors: Norman L. Newhouse, Lincoln, NE (US); Chad A. Cederberg, Lincoln, NE (US)

(73) Assignee: Hexagon Technology AS, Alesund (NO)

( * ) Notice: Subject to any disclaimer, the term of this patent is extended or adjusted under 35 U.S.C. 154(b) by 84 days.

(21) Appl. No.: 15/478,636

(22) Filed: Apr. 4, 2017

(65) Prior Publication Data

US 2017/0292651 A1    Oct. 12, 2017

Related U.S. Application Data

(60) Provisional application No. 62/318,940, filed on Apr. 6, 2016.

(51) Int. Cl.
*F17C 1/06* (2006.01)
*B22F 3/11* (2006.01)
(Continued)

(52) U.S. Cl.
CPC ............... *F17C 1/06* (2013.01); *B22F 3/11* (2013.01); *B22F 3/24* (2013.01); *F17C 1/16* (2013.01);
(Continued)

(58) Field of Classification Search
CPC ...... F17C 2205/0305; F17C 2205/0344; F17C 2209/2109; F17C 2209/2161;
(Continued)

(56) References Cited

U.S. PATENT DOCUMENTS 1,651,521 A   12/1927   Girardville
1,835,699 A   12/1931   Edmonds
(Continued)

FOREIGN PATENT DOCUMENTS

EP    2894387    *  7/2015  ............... F17C 1/06
EP    2894387 A2    7/2015
(Continued)

OTHER PUBLICATIONS

International Search Report and Written Opinion dated Jul. 6, 2017 for International Application No. PCT/US2017/025892.

*Primary Examiner* — Andrew T Kirsch
*Assistant Examiner* — Elizabeth J Volz
(74) *Attorney, Agent, or Firm* — Mai-Tram D. Lauer; Westman, Champlin & Koehler, P.A.

(57) ABSTRACT

A pressure vessel includes a shell, a liner, and a boss. The liner is positioned within the shell and defines the interior environment. The boss is located at a first interface between the shell and the liner. The boss includes a cavity and a venting structure located in the cavity. The cavity is located at a second interface between the liner and the boss, and the cavity is located at an interior surface of the boss in communication with the interior environment. A gas vent path is defined from the first interface, through the venting structure, and into the interior environment of the pressure vessel. The disclosure also describes a boss for a pressure vessel and a method of manufacturing the boss. The boss includes a port, a flange, a cavity and a gas venting structure. The cavity and gas venting structure are located on an interior of the flange.

16 Claims, 14 Drawing Sheets

(51) Int. Cl.
  *B22F 3/24* (2006.01)
  *F17C 1/16* (2006.01)
  *F17C 13/00* (2006.01)

(52) U.S. Cl.
  CPC ...... *F17C 13/002* (2013.01); *B22F 2003/247* (2013.01); *B22F 2998/10* (2013.01); *F17C 2201/0109* (2013.01); *F17C 2203/0604* (2013.01); *F17C 2203/0663* (2013.01); *F17C 2205/0305* (2013.01); *F17C 2205/0344* (2013.01); *F17C 2209/2109* (2013.01); *F17C 2209/2163* (2013.01); *F17C 2209/2181* (2013.01); *F17C 2260/036* (2013.01)

(58) Field of Classification Search
  CPC ...... F17C 2209/2181; F17C 1/06; F17C 1/16; F17C 2203/0604; F17C 2203/0619; F17C 2203/066; F17C 2203/0663; F17C 13/002; F17C 2201/0109; F17C 2201/056; F17C 2221/011; F17C 2221/012; F17C 2221/014; F17C 2221/033; F17C 2221/035; F17C 2223/0123; F17C 2223/0153; F17C 2223/033; F17C 2223/035; F17C 2260/011; F17C 2260/036; F17C 2260/037; B22F 3/11; B22F 3/24; B22F 2003/247; B22F 2998/10; Y02E 60/321
  USPC .................................. 220/565, 581, 586, 592
  See application file for complete search history.

(56) References Cited

U.S. PATENT DOCUMENTS

| | | |
|---|---|---|
| 2,243,240 A | 5/1941 | Zerbe |
| 2,344,856 A | 3/1944 | Earle |
| 3,224,619 A | 12/1965 | Maurin |
| 3,231,338 A | 1/1966 | Andrus |
| 3,348,728 A | 10/1967 | Love |
| 3,368,586 A | 2/1968 | French |
| 3,472,632 A | 10/1969 | Hervert |
| 3,488,160 A | 1/1970 | Noel |
| 3,604,587 A | 9/1971 | Pechacek |
| 3,785,040 A | 1/1974 | Pechacek |
| 3,841,520 A | 10/1974 | Bryant |
| 3,920,518 A | 11/1975 | Brissaud |
| 4,107,372 A | 8/1978 | Clausen |
| 4,135,621 A | 1/1979 | Turillon |
| 4,241,843 A | 12/1980 | Walker |
| 4,298,416 A | 11/1981 | Casson |
| 4,358,377 A | 11/1982 | Clark |
| 4,777,982 A | 10/1988 | Borowitz |
| 5,476,189 A | 12/1995 | Duvall |
| 5,697,515 A | 12/1997 | Syler |
| 5,901,379 A | 5/1999 | Hirata |
| 6,503,584 B1 | 1/2003 | McAlister |
| 6,648,167 B1 | 11/2003 | Brupbacher |
| 6,787,007 B2 | 9/2004 | Lessing |
| 7,287,663 B2 | 10/2007 | Vandal |
| 7,870,971 B2 | 1/2011 | Schlag |
| 8,076,015 B2 | 12/2011 | Bouffard |
| 8,608,014 B2 | 12/2013 | Mueller |
| 8,652,589 B2 | 2/2014 | Ramm |
| 8,695,651 B2 | 4/2014 | Frenal |
| 9,205,373 B2 | 12/2015 | Leavitt |
| 2009/0057319 A1 | 3/2009 | Schlag |
| 2011/0240655 A1 | 10/2011 | Lindner |
| 2012/0048865 A1 | 3/2012 | Eihusen |
| 2012/0291878 A1 | 11/2012 | Pisot |
| 2013/0341235 A1 | 12/2013 | Leavitt |
| 2014/0103051 A1 | 4/2014 | Kanezaki |
| 2014/0203026 A1 | 7/2014 | Jaeger |
| 2016/0053945 A1 | 2/2016 | Leavitt |

FOREIGN PATENT DOCUMENTS

| | | | |
|---|---|---|---|
| FR | 2956185 A1 | 12/2011 | |
| JP | H09222198 A | 8/1997 | |
| JP | H11210988 | * 8/1999 | ................ F17C 1/00 |
| JP | H11210988 A | 8/1999 | |
| RU | 2117853 C1 | 8/1998 | |
| RU | 2162564 C1 | 1/2001 | |
| RU | 2187746 C2 | 8/2002 | |
| WO | 008368 A1 | 2/2000 | |
| WO | 0246654 A1 | 6/2002 | |

\* cited by examiner

PRESSURE VESSEL VENTED BOSS WITH SINTERED METAL PLUG

CROSS REFERENCE TO RELATED APPLICATION

This application claims the benefit of priority from U.S. Provisional Patent Application Ser. No. 62/318,940, filed Apr. 6, 2016, entitled "Pressure Vessel Vented Boss with Sintered Metal Plug," which is hereby incorporated in its entirety.

BACKGROUND

Pressure vessels are commonly used for containing a variety of fluids under pressure, such as hydrogen, oxygen, natural gas, nitrogen, propane, methane and other fuels, for example. Generally, pressure vessels can be of any size or configuration. The vessels can be heavy or light, single-use (e.g., disposable), reusable, subjected to high pressures (greater than 50 psi, for example), low pressures (less than 50 psi, for example), or used for storing fluids at elevated or cryogenic temperatures, for example.

Suitable pressure vessel shell materials include metals, such as steel; or composites, which may include laminated layers of wound fiberglass filaments or other synthetic filaments bonded together by a thermal-setting or thermoplastic resin. The fiber may be fiberglass, aramid, carbon, graphite, or any other generally known fibrous reinforcing material. The resin material used may be epoxy, polyester, vinyl ester, thermoplastic, or any other suitable resinous material capable of providing fiber-to-fiber bonding, fiber layer-to-layer bonding, and the fragmentation resistance required for the particular application in which the vessel is to be used. The composite construction of the vessels provides numerous advantages such as lightness in weight and resistance to corrosion, fatigue and catastrophic failure. These attributes are due at least in part to the high specific strengths of the reinforcing fibers or filaments.

A polymeric or other non-metallic resilient liner or bladder is often disposed within a composite shell to seal the vessel and prevent internal fluids from contacting the composite material. The liner can be manufactured by compression molding, blow molding, injection molding, or any other generally known technique. Alternatively, the liner can be made of other materials, including steel, aluminum, nickel, titanium, platinum, gold, silver, stainless steel, and any alloys thereof. Such materials can be generally characterized as having a high modulus of elasticity. In one embodiment, liner 20 is formed of blow molded high density polyethylene (HDPE).

FIG. 1 illustrates an elongated pressure vessel 10, such as that disclosed in U.S. Pat. No. 5,476,189, entitled "Pressure vessel with damage mitigating system," which is hereby incorporated by reference. Pressure vessel 10 has a main body section 12 and substantially hemispherical or dome-shaped end sections 14. A boss 16, typically constructed of aluminum, is provided at one or both ends of the pressure vessel 10 to provide a port for communication between the interior environment 17 of the pressure vessel 10 and the exterior environment 19. As shown in FIG. 2, pressure vessel 10 is formed with liner 20 (such as an inner polymer liner) covered by a shell 18. In an example, the shell 18 can be a filament-wound composite shell. The shell 18 resolves structural loads on the pressure vessel 10, while liner 20 provides a gas barrier.

FIG. 2 illustrates a partial cross-sectional view, taken along line 2-2 of FIG. 1, of an end section 14 including boss 16, such as that disclosed in U.S. Pat. No. 5,429,845, entitled "Boss for a filament wound pressure vessel," which is hereby incorporated by reference. The boss 16 (shown separately in FIG. 3) includes neck 22. The neck 22 includes an exterior surface 23 and a port 26. The port 26 perpendicularly traverses the exterior surface 23 of the boss 16 and allows fluid communication between the exterior environment 19 and the interior environment 17 of pressure vessel 10. The boss 16 also includes a flange 24 (depicted as an annular flange) extending radially outward from longitudinal axis 36 of port 26. As shown, FIG. 2 illustrates an interface 60 between the shell 18 and the liner 20. FIG. 2 also illustrates an interface 62 between the liner 20 and the boss 16. In this disclosure, surfaces, directions, and elements facing interior environment 17 are referred to with the descriptor "interior," and surfaces, directions, and elements facing exterior environment 19 are referred to with the descriptor "exterior." It is to be understood that this non-limiting notation is provided merely for convenience and ease of comprehension; other descriptors may also be used and/or suitable.

Generally, flange 24 of boss 16 is contained between portions of liner 20 and/or is sandwiched between the liner 20 and the shell 18. Typically, shell 18 abuts neck 22. Flange 24 includes an exterior side 38 and an interior side 37. Flange 24 may include at least one groove 32 (depicted as an annular groove) that is shaped to accept a tab 34 (such as an annular tab) of liner 20. This construction secures the boss 16 to the pressure vessel 10 and provides a seal at interface 62 between the boss 16 and liner 20.

A method of forming a pressure vessel 10 includes mounting a boss on a mandrel and allowing a fluid polymer material for liner 20 to flow around flange 24 and into groove 32 of boss 16. The liner material then solidifies, thereby forming a portion of liner 20 adjacent to flange 24 and tab 34 received within groove 32. Liner 20 is thereby mechanically interlocked with boss 16. Accordingly, even under extreme pressure conditions, separation of liner 20 from boss 16 is prevented.

In an exemplary embodiment, shell 18 is formed from wound fibers and surrounds the liner 20 (and in some cases, also a portion of flange 24 of boss 16). In an exemplary method, a dispensing head for the fibers moves in such a way as to wrap the fiber on the liner 20 in a desired pattern. If the pressure vessel 10 is cylindrical, rather than spherical, fiber winding is normally applied in both a substantially longitudinal (helical) and circumferential (hoop) wrap pattern. This winding process is defined by a number of factors, such as resin content, fiber configuration, winding tension, and the pattern of the wrap in relation to the axis of the liner 20. Details relevant to the formation of an exemplary pressure vessel are disclosed in U.S. Pat. No. 4,838,971, entitled "Filament Winding Process and Apparatus," which is incorporated herein by reference.

Although the liner 20 provides a gas barrier under typical operating conditions, the design of pressure vessel 10 of this type produces a phenomenon wherein gas diffuses into the liner 20 under pressurization of pressure vessel 10. When depressurization of the pressure vessel 10 occurs, this gas diffuses out of the liner 20, and in some cases into interface 60 between the liner 20 and the shell 18, or even in some instances into interface 62 between the liner 20 and the boss 16. A pocket of gas may be formed, forcing the liner 20 to bulge inward and possibly become stretched. Moreover, gas at the interface 60 between the liner 20 and the shell 18 can promote undesirable separation between the liner 20 and the shell 18. Also, upon re-pressurization, the gas trapped between liner 20 and the shell 18 may be expelled abruptly through microcracks in the shell 18 at high pressures. The relatively sudden expulsion of gas can set off leak detectors, when, in actuality, pressure vessel 10 exhibits no steady leak. Additionally, the gas trapped between liner 20 and the shell 18 may move to interface 62 between the liner 20 and the boss 16, thereby weakening the connection between the liner 20 and boss 16.

SUMMARY

In one aspect, a pressure vessel having an interior environment is disclosed, the pressure vessel including a shell, a liner, and a boss. The liner is positioned within the shell and defines the interior environment. The boss is located at a first interface between the shell and the liner. The boss includes a cavity and a venting structure located in the cavity. The cavity is located at a second interface between the liner and the boss, and the cavity is located at an interior surface of the boss in communication with the interior environment. A gas vent path is defined from the first interface, through the venting structure, and into the interior environment of the pressure vessel.

In another aspect, the disclosure describes a boss for a pressure vessel including a port, a flange, a cavity and a gas venting structure. The port is configured to permit fluid communication between an exterior environment of the pressure vessel and an interior environment of the pressure vessel. The flange extends radially outward from the port, and the flange includes an exterior side and an interior side. The cavity is located on the interior side of the flange. The gas venting structure is located in the cavity.

In yet another aspect, a method of manufacturing a boss for use in a pressure vessel includes sintering a metal part such that it has a porosity that permits fluid to pass through the sintered metal part, but restricts molten polymer material from entering the sintered metal part; and inserting the sintered metal part into a corresponding cavity of the boss.

This disclosure, in its various combinations, either in apparatus or method form, may also be characterized by the following listing of items:

1. A pressure vessel having an interior environment, the pressure vessel including:
    a shell;
    a liner positioned within the shell and defining the interior environment;
    a boss located at a first interface between the shell and the liner, the boss including:
        a cavity at a second interface between the liner and the boss, the cavity located at an interior surface of the boss in communication with the interior environment; and
        a venting structure located in the cavity, wherein a gas vent path is defined from the first interface, through the venting structure, and into the interior environment of the pressure vessel.
2. The pressure vessel of item 1, wherein the venting structure includes a sintered metal.
3. The pressure vessel of any of items 1-2, wherein the venting structure has a porosity that allows gas to pass through the venting structure while inhibiting material of the liner from entering the venting structure.
4. The pressure vessel of any of items 1-3, wherein the venting structure has an annular shape.
5. The pressure vessel of item 4, wherein the cavity includes a complementary annular shape corresponding to the annular shape of the venting structure.
6. The pressure vessel of any of items 1-5, wherein the venting structure is one of a set of venting structures.
7. The pressure vessel of item 6, wherein the cavity is one of a set of cavities, and wherein each cavity of the set of cavities is configured to correspond to a shape of one of the venting structures of the set of the venting structures.
8. The pressure vessel of item 7, wherein the cavities of the set of cavities are circumferentially spaced apart from each other equally.
9. A boss for a pressure vessel, including:
    a port configured to permit fluid communication between an exterior environment of the pressure vessel and an interior environment of the pressure vessel;
    a flange extending radially outward from the port, the flange including an exterior side and an interior side;
    a cavity located on the interior side of the flange; and
    a gas venting structure located in the cavity.
10. The boss of item 9, wherein the gas venting structure includes a sintered metal.
11. The boss of any of items 9-10, wherein the gas venting structure has a porosity that allows gas to pass through the gas venting structure while inhibiting molten polymer material from entering the gas venting structure.
12. The boss of any of items 9-11, wherein the gas venting structure has an annular shape.
13. The boss of item 12, wherein the cavity includes a complementary annular shape corresponding to the annular shape of the gas venting structure.
14. The boss of any of items 9-13, wherein the venting structure is one of a set of venting structures.
15. The boss of item 14, wherein the cavity is one of a set of cavities, and wherein each cavity of the set of cavities is configured to correspond to a shape of one of the venting structures of the set of the venting structures.
16. The boss of item 15, wherein the cavities of the set of cavities are circumferentially spaced apart from each other equally.
17. A method of manufacturing a boss for use in a pressure vessel, including:
    sintering a metal part such that it has a porosity that permits gas to pass through the sintered metal part, but restricts molten polymer material from entering the sintered metal part; and
    inserting the sintered metal part into a corresponding cavity of the boss.
18. The method of item 17, further including machining the corresponding cavity.
19. The method of item 18, wherein the boss includes a port connecting an exterior side of the boss and an interior side of the boss, and wherein the machining includes machining a surface on the interior side of the boss.
20. The method of item 19, wherein the boss includes a flange extending radially outward from the port, the flange including an exterior side and an interior side, and wherein the machining includes machining a surface on the interior side of the flange.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as interior, exterior, above, below, over, under, top, bottom, side, right, left, etc., are used, it is to be understood that they are used only for ease of understanding the description. It is contemplated that structures may be oriented otherwise.

DETAILED DESCRIPTION

Figure 4A:
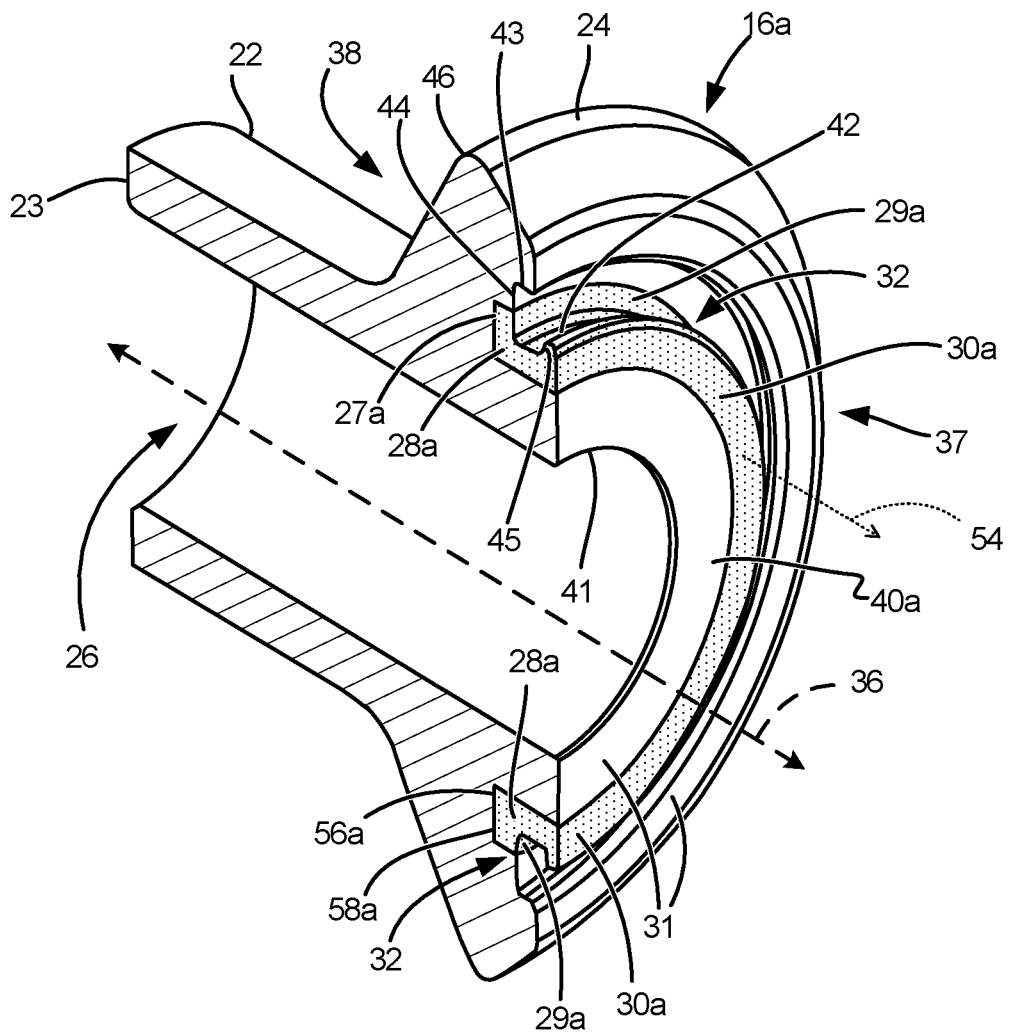
FIG. 4A is a perspective radial cross-sectional view of a first exemplary boss of the present disclosure with a first exemplary venting structure.
Figure 5:
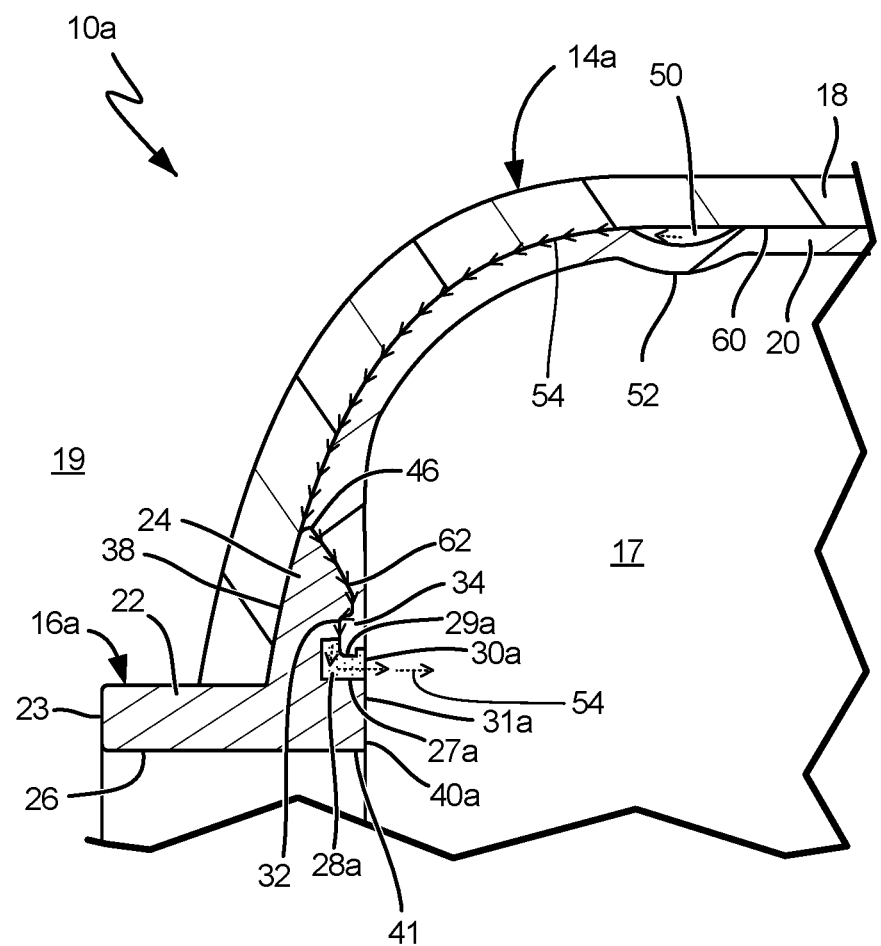
FIG. 5 is a partial cross-sectional view of a top half of a pressure vessel including the boss of FIGS. 4A and 4B, taken along line 5-5 of FIG. 4B, and including a liner and shell.

The present disclosure describes exemplary gas venting structures, and methods for generating such venting structures, for use in a pressure vessel. The gas venting structures can be embedded in a boss of a pressure vessel, such that the exemplary structures prevent separation of the liner from the boss and/or the liner from the shell under pressure. The gas venting structures allow venting of gas trapped between the liner and the shell (or the boss), such as gas trapped between the liner and an interior surface of the shell that interfaces the liner. This disclosure relates, in one aspect, to combining at least one of the exemplary gas venting structures with boss 16 of pressure vessel 10. In some embodiments, the venting structure is configured as a plug or insert positioned in a corresponding cavity of the boss. Each of the exemplary gas venting structures has features to allow gas that accumulates between liner 20 and shell 18 (or boss 16) to vent to the interior environment 17 of the pressure vessel 10. If a port of boss 16 is open (such as port 26), gas from the interior environment 17 of pressure vessel 10 can then vent to exterior environment 19 outside of the pressure vessel 10. For example, as shown in FIGS. 4A and 5, first exemplary venting structure 28a provides a path 54 through which gas may vent from interface 60 between shell 18 and liner 20 to the environment 17 internal to pressure vessel 10. Thus, damage to liner 20 and unwanted venting through shell 18 is prevented.

Figure 1:
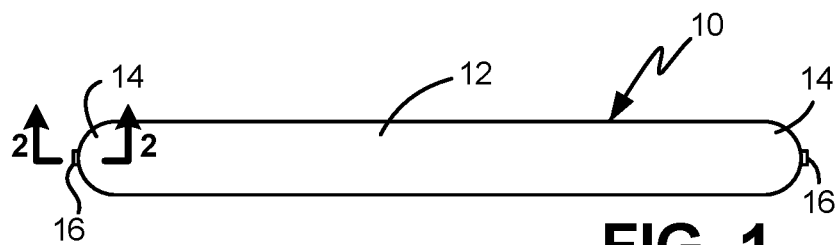
FIG. 1 is a side view of a typical conventional pressure vessel.
Figure 2:
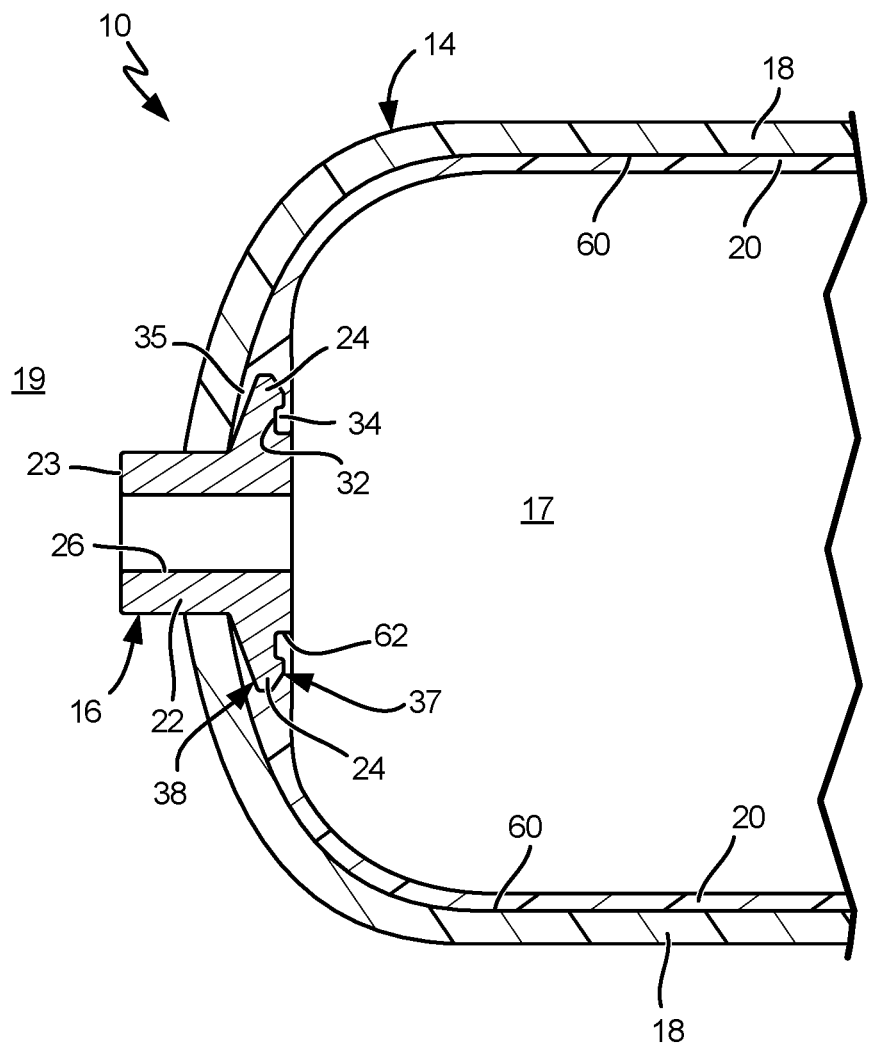
FIG. 2 is a partial sectional side view of one end of the pressure vessel of FIG. 1, taken along line 2-2 of FIG. 1 and showing a typical boss, liner and shell assembly.
Figure 3:
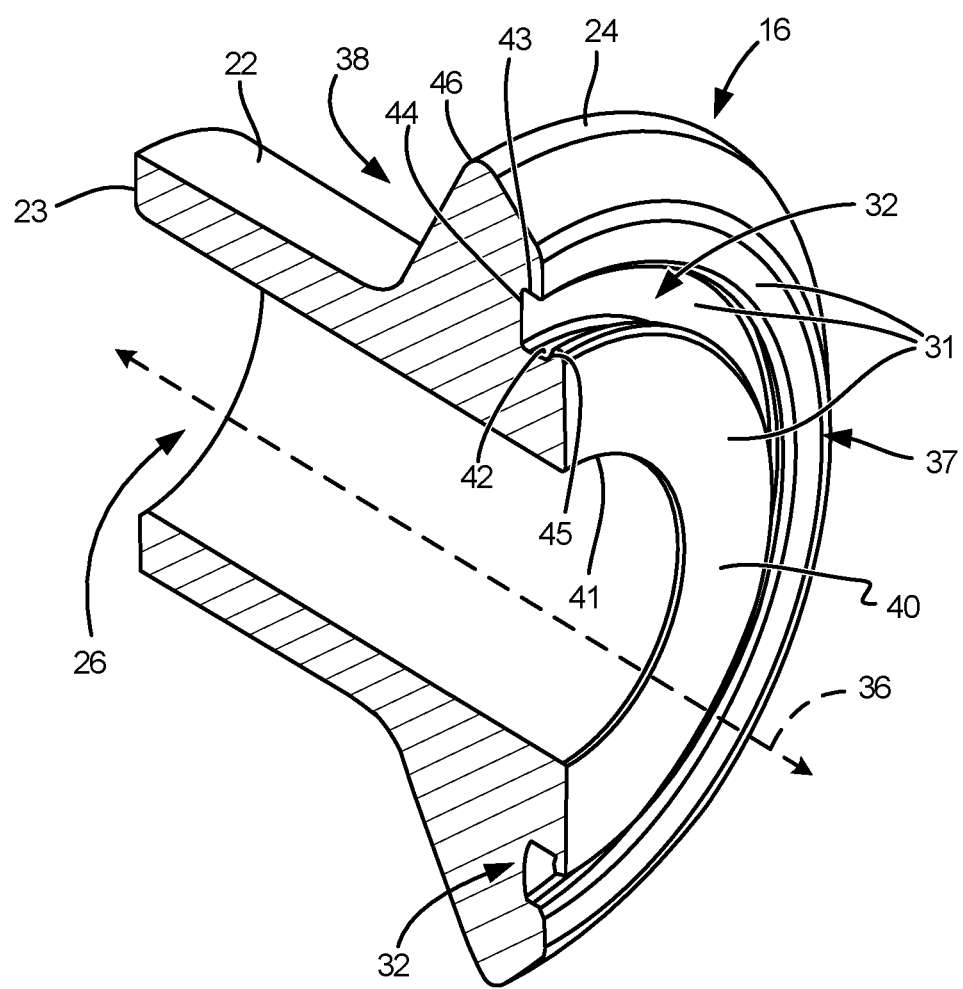
FIG. 3 is a perspective radial cross-sectional view of the boss of the pressure vessel of FIGS. 1 and 2.
Figure 10:
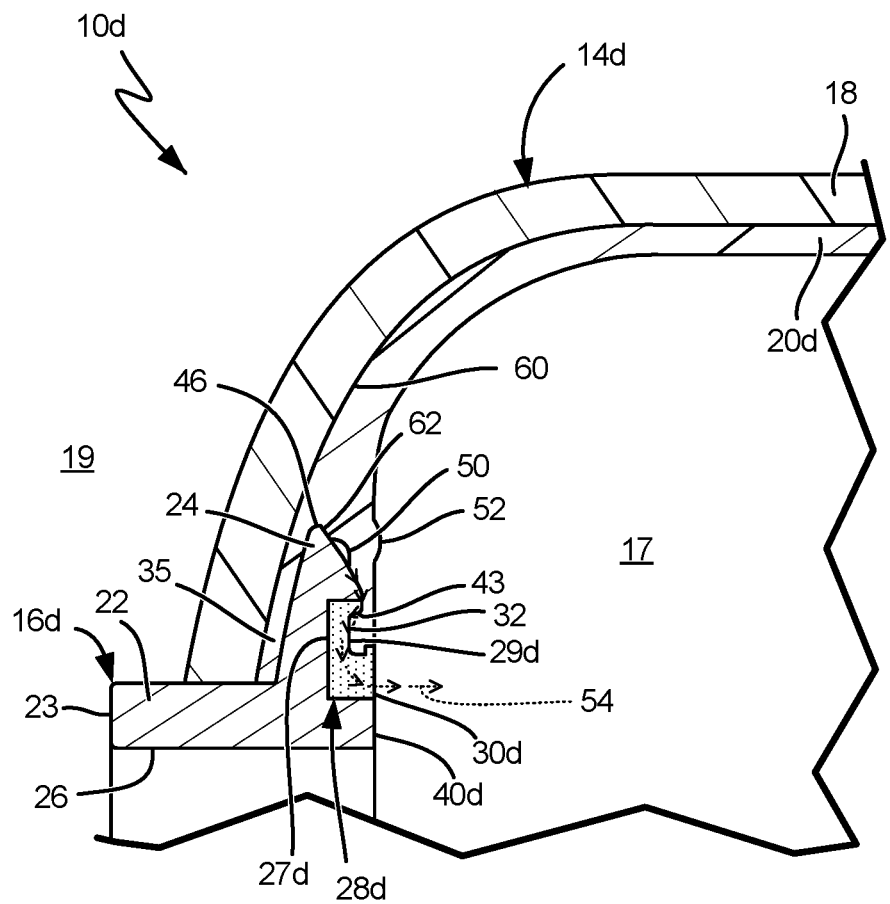
FIG. 10 is a partial radial cross-sectional view of a top half of a pressure vessel including a fourth exemplary boss of the present disclosure with a fourth exemplary venting structure, and including a liner and shell.
Figure 11:
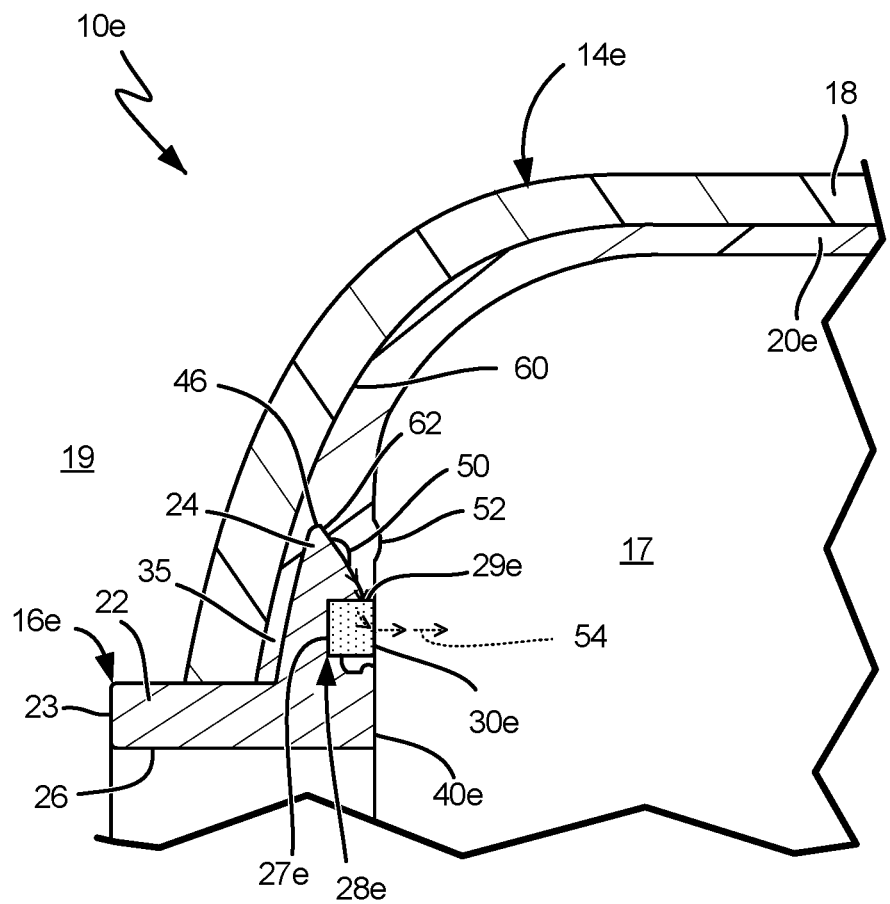
FIG. 11 is a partial radial cross-sectional view of a top half of a pressure vessel including a fifth exemplary boss of the present disclosure with a fifth exemplary venting structure, and including a liner and shell.

FIG. 3 shows a conventional boss 16 without one of the exemplary venting structures embedded in boss 16. Boss 16 includes neck 22 having port 26 (which may have been bored) that allows fluid communication between the interior environment 17 of pressure vessel 10 and the environment 19 exterior to pressure vessel 10. Port 26 has longitudinal axis 36. Boss 16 can have flange 24 (depicted as an annular flange) extending radially outwardly from port 26 and terminating at distal edge 46. In an exemplary embodiment, flange 24 has groove 32 (depicted as an annular groove) to accept a tab 34 of liner 20, which has a cooperating and complementary configuration. Mechanical inter-locks (i.e., elements that are structurally inhibited from separation) are shown, but it is contemplated that other methods of mechanically, frictionally, or chemically (e.g., by the use of adhesives) securing liner 20 to boss 16 may be used. It is noted that in some embodiments, a portion 35 of liner 20 extends over an exterior side 38 of flange 24 to aid in connecting liner 20 and boss 16, as illustrated in FIGS. 1, 10 and 11.

Figure 4B:
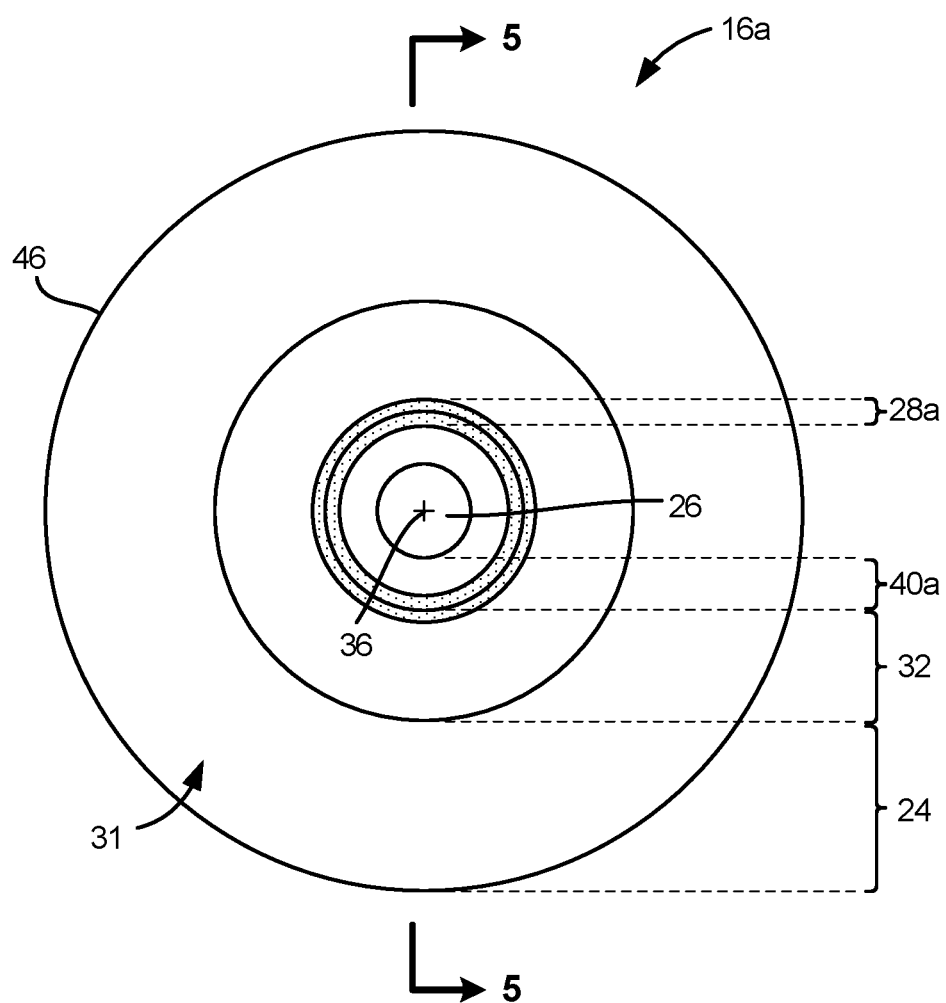
FIG. 4B is an interior view of the first exemplary boss of FIG. 4A.

FIG. 4A is a perspective radial cross-sectional view of first exemplary boss 16a with first exemplary venting structure 28a fitted into venting-structure-receiving cavity 27a of boss 16a. FIG. 4B is an interior end view of first exemplary boss 16a. FIG. 5 is a partial cross-sectional view of a pressure vessel 10a including first exemplary boss 16a, taken along line 5-5 of FIG. 4B, liner 20 and shell 18.

The liner 20 serves as a gas barrier and defines interior environment 17. However, as discussed above, in some high pressure applications, the gas can undesirably diffuse through liner 20 and to an interface 60 between liner 20 and shell 18. In an exemplary embodiment, first exemplary venting structure 28a—and any other of the exemplary venting structures described herein—can have microscopic vent channels to fluidly connect the interior environment 17 of vessel 10 to the interface 60 between liner 20 and shell 18. The exemplary venting structures are configured to prevent gas that has permeated through liner 20 and into at least interface 60 between liner 20 and shell 18 from becoming trapped, by providing a vent path 54. Vent path 54 defines a path of least gas flow resistance from interface 60. As shown in FIG. 5, the gas in pocket 50 more easily moves along interface 60 than through the materials of either liner 20 or shell 18. Thus, gas travels from pocket 50 and along interface 60 to interface 62 between liner 20 and boss 16a. Cavity 27a, which contains venting structure 28a, is positioned at a location along interface 62 and at interior surface 31 of boss 16a. Cavity 27a, and therefore venting structure 28a, is located at interior surface 31 of boss 16a in communication with interior environment 17. Because a material bond strength between liner 20 and boss 16a is typically weaker than a material bond strength between shell 18 and boss 16a, the gas generally travels along the illustrated path 54 at the interface 62. Upon reaching venting structure 28a, which has higher gas permeability compared to the materials of either liner 20 or boss 16a, the gas flows in path 54 through venting structure 28a and out interior surface 30a, into interior environment 17 of pressure vessel 10a. Thus, vent path 54 is defined from interface 60, though venting structure 28a, and into the interior environment 17 of pressure vessel 10a.

First exemplary venting structure 28a—and any other of the exemplary venting structures described herein—may be formed of a metallic or non-metallic material, or a combination thereof, such as, for example, aluminum, steel, iron, bronze, brass, or a polymer or composite material. A metallic material may be sintered so that the venting structure 28 includes sintered metallic material. An exemplary venting structure 28 has a porosity and/or density that allows gas to pass through it while inhibiting material of liner 20 from entering the venting structure during manufacturing of the vessel. While there may be some permeation of the liner material onto venting structure 28 at liner interface surface 29, significant penetration of the liner material into the venting structure 28 is prevented. Any of the venting structures 28 described herein may be formed by machining a sintered material blank into the desired shape for the structure 28. In an alternative example, the venting structure 28 may be formed in a desired shape, such as by filling a die or mold with metal powder, and then sintering. In one method, the cavity 27 in the boss serves as at least part of the die or mold for the material powder, and the venting structure 28 is formed by sintering the material in situ in the boss cavity 27. Sintering forms microscopic vent channels in the venting structure by the generation of pores in the sintered material. Suitable processes include, for example, powder forging, hot or cold isostatic pressing, metal injection molding, electric current assisted sintering, and additive manufacturing. The microscopic vent channels can include diameters in the range of 0.1 to 1 micrometers, for example, due to the sintering process. Exemplary venting structures 28 have a porosity of about 5% to about 15%. Exemplary venting structures 28 have a density of about 5.2 grams/cubic centimeter to about 7.9 grams/cubic centimeter.

In an exemplary embodiment of manufacturing of the vessel 10a, the boss 16a Includes—or is provided with—a venting-structure-receiving cavity 27a for receiving the first exemplary venting structure 28a. The cavity 27a can include surface 56a. The surface 56a can be adhered to surface 58a of the first exemplary venting structure 28a by a high temperature resistant adhesive or by other means, including welding the surface 58a to the surface 56a, for example. In an exemplary embodiment, venting structure 28a is shaped to fill the recess or cavity 27a so that boss 16a with venting structure 28a has substantially the same configuration as boss 16 of FIG. 3.

Also, the material forming the exemplary venting structure may be formed to fit the venting-structure-receiving cavity of the boss instead of the cavity being formed to fit the venting structure. In another exemplary embodiment of manufacturing the boss, a portion of the boss can be treated with heat and/or a chemical(s) such that the portion of the boss becomes the first exemplary venting structure 28a. In this last example, a venting-structure-receiving cavity is not machined into the boss.

First exemplary venting structure 28a—and any other of the exemplary venting Structures—may include liner interface surface 29a and interior surface 30a (facing the interior 17 of pressure vessel 10a). In an exemplary embodiment, liner interface surface 29a is in groove 32, such that liner interface surface 29 contacts tab 34 of liner 20. Liner interface surface 29a can be configured such that gas trapped between liner 20 and liner interface surface 29a can enter first exemplary venting structure 28a. After entering the venting structure 28a, the gas can move through microscopic vent channels in the venting structure 28a. The gas exits the venting structure 28a at interior surface 30a to vent to interior environment 17 of pressure vessel 10. The venting structure 28a thereby fluidly connects the interior environment 17 to the interface 60 between liner 20 and shell 18.

In an exemplary embodiment, interior surface 30a of venting structure 28a is flush with the interior surface 31 of first exemplary boss 16a. The interior surface 30a faces the interior environment 17 of pressure vessel 10. In an exemplary embodiment, the interior surface 30a is spaced from bore surface 41 of port 26. Interior surface 30a can be configured such that gas can—without resistance from liner 20—exit interior surface 30a after the addition of liner 20 to the vessel (as shown in FIG. 5 by the path of gas travel 54).

In an exemplary embodiment, as shown in FIG. 4A, first exemplary venting structure 28a corresponds to an annular shape of venting-structure-receiving cavity 27a of boss 16a. As shown, the first exemplary venting structure 28a—and of any other of the exemplary venting structures—can at least partially abut groove 32. As shown, the first exemplary venting structure 28a defines an inner surface 42 of the groove 32 and at least part of an exterior portion 44 and interior portion 45 of the groove 32. Also, the venting structure 28a may wrap around all the way to outer surface 43 of groove 32, as shown in FIG. 10. The surface of first exemplary venting structure 28a at exterior portion 44 of groove 32, inner surface 42, and interior portion 45 of groove 32 defines liner interface surface 29a. While venting structure 28a at least partially includes inner surface 42, exterior portion 44 and interior portion 45 of groove 32, other exemplary venting structures may have other configurations. Some exemplary embodiments are illustrated herein, but it is contemplated that many other variations are possible.

As show in FIGS. 4A and 4B, the interior surface 31 of first exemplary boss 16a has a circular shape with undulating surface contours, including interior surfaces of flange 24, groove 32 and inner portion 40. The interior view of FIG. 4B shows that each of the aforementioned features of first exemplary boss 16a at their respective interior ends have circular shapes, where the interior end of flange 24 encircles the interior end of groove 32, which in turn encircles inner portion 40a, which encircles the port 26. It is contemplated that vent structures 28 can also be provided on an interior surface 31 of a boss 16 having no groove 32.

In the exemplary embodiment shown in FIG. 5, gas pocket 50 is formed at interface 60 between liner 20 and shell 18, causing a deformation 52 of liner 20 (which is greatly exaggerated in the illustration for purposes of discussion). As shown by path of gas travel 54, the gas follows a path of least resistance from gas pocket 50 along the interface 60 between liner 20 and shell 18 to interface 62 between liner 20 and first exemplary boss 16a. The gas then can travel to an interface 29a between first exemplary venting structure 28a and liner 20. The gas enters channels of venting structure 28a via liner interface surface 29a and travels through the channels to an interior environment 17 of the vessel, as indicated by path 54. While path 54 is shown only on a portion of vessel 10a, it is to be understood that such vent paths may be located from gas pockets located anywhere at interface 60 through any radial portion of venting structure 28a.

Deformation 52 depicts a bulge or bubble, but is shown as such merely for discussion purposes. Moreover, the size of deformation 52 is exaggerated for purposes of illustration. Different amounts of gas may exist anywhere in the interface 60 between liner 20 and shell 18, and/or in the interface 62 between boss 16 and liner 20, causing various deformations 52 of liner 20 if not allowed to vent. While the drawing figures show deformation 52 for discussion purposes, it is contemplated that the provision of venting structure 28 on pressure vessels 10 would actually prevent the formation of such deformations 52.

Figure 6A:
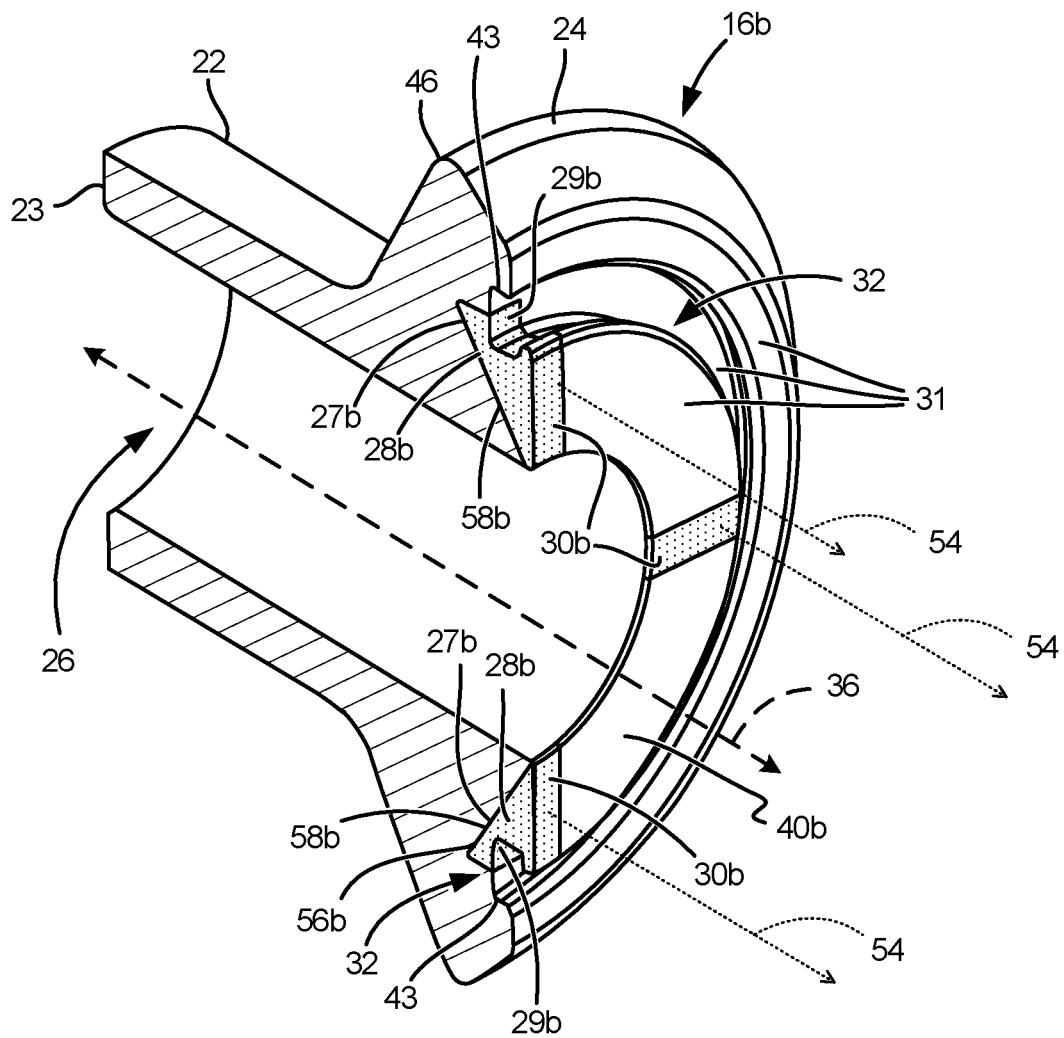
FIG. 6A is a perspective radial cross-sectional view of a second exemplary boss of the present disclosure with a second exemplary venting structure.
Figure 6B:
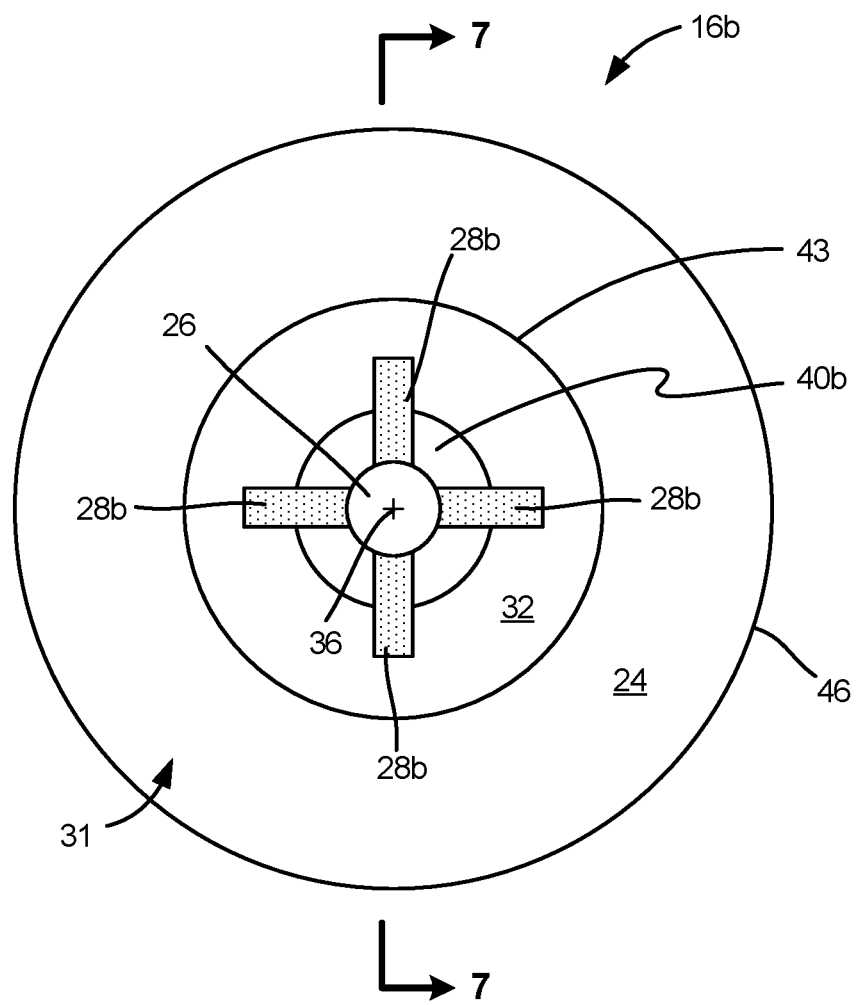
FIG. 6B is an interior view of the second exemplary boss of FIG. 6A.
Figure 7:
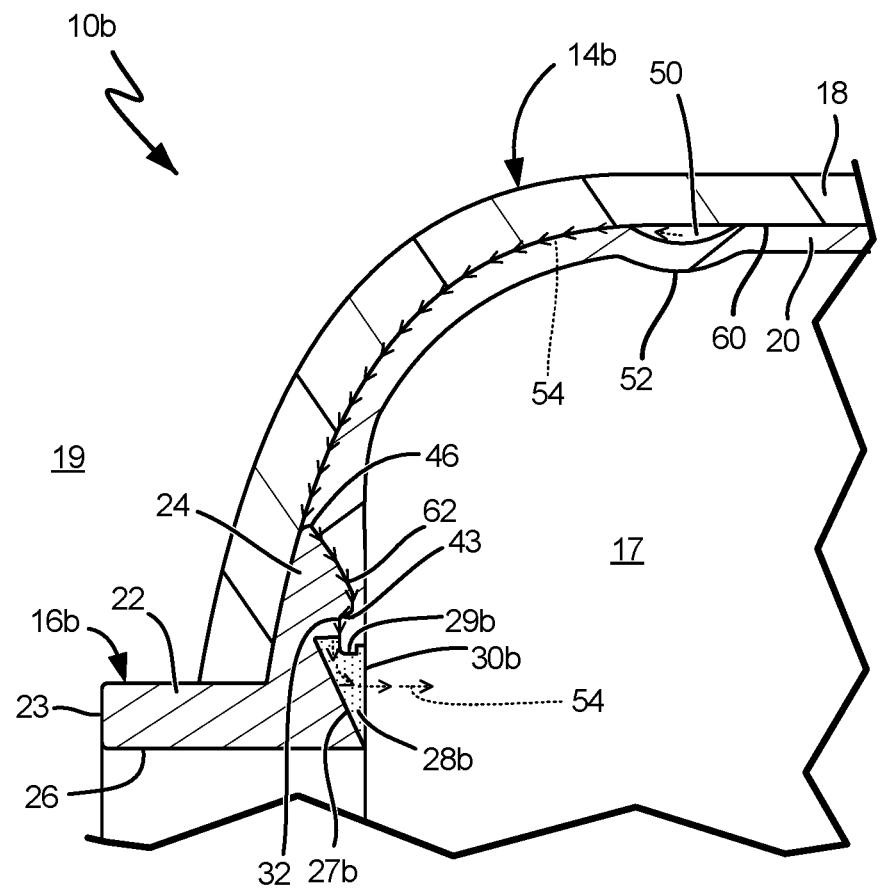
FIG. 7 is a partial cross-sectional view of a top half of a pressure vessel including the boss of FIGS. 6A and 6B, taken along line 7-7 of FIG. 6B, and including a liner and shell.

FIG. 6A is a perspective radial cross-sectional view of second exemplary boss 16b with second exemplary venting structure 28b. FIG. 6B is an interior side view of second exemplary boss 16b. FIG. 7 is a perspective cross-sectional view of a pressure vessel including second exemplary boss 16b, taken along line 7-7 of FIG. 6B, liner 20, and shell 18. Second exemplary boss 16b illustrated in FIGS. 6A-7 is similar to first exemplary boss 16a illustrated in FIGS. 4A-5, except for structural differences due to the shape of second exemplary venting structure 28b differing from the shape of first exemplary venting structure 28a.

In the illustrated embodiment, venting structure 28b is one of a set of similar venting structures 28b, each one of which is configured as a wedged-shaped body. Each venting structure 28b is located in a cavity 27b having a shape that corresponds to the shape of its respective venting structure 28b. Each cavity 27b is one of a set of cavities 27b, each one of which contains a venting structure 28b. In an exemplary embodiment, each of the venting structures 28b is substantially in the form of a triangular prism. Such a shape provides liner interface surface 29b on at least two sides of groove 32 while simultaneously reducing the presence of venting structure 28b at bore surface 41 of port 26. Accordingly, the strength of boss 16b proximate port 26 is maintained. Moreover, a relatively large venting interior surface 30b of venting structure 28b is provided.

Venting structures 28b are shown positioned in corresponding venting-structure-receiving cavities 27b of boss 16b. While four venting structures 28b are shown, it is contemplated that more or fewer wedge shaped bodies can be used. In an exemplary embodiment, a substantially triangular shape is bounded by three surfaces including liner interface surface 29b, interior surface 30b, and a surface 58b, which may be substantially a hypotenuse with respect to liner interface surface 29b and interior surface 30b. The cavity 27b can include surface 56b. The surface 56b can be adhered to surface 58b of the second exemplary venting structure 28b by a high temperature resistant adhesive or by welding the surface 58b to the surface 56b, for example.

As shown in FIG. 7, gas in pocket 50 between liner 20 and shell 18 flows along vent path 54 to exhaust into interior environment 17. Path 54 begins at pocket 50 at interface 60 between liner 20 and shell 18 and continues to interface 62 between liner 20 and boss 16b. The gas then can travel to an interface 29b between venting structure 28b and liner 20. The gas enters channels of venting structure 28b via liner interface surface 29b and travels through the channels to an interior environment 17 of the vessel 10b.

Figure 8A:
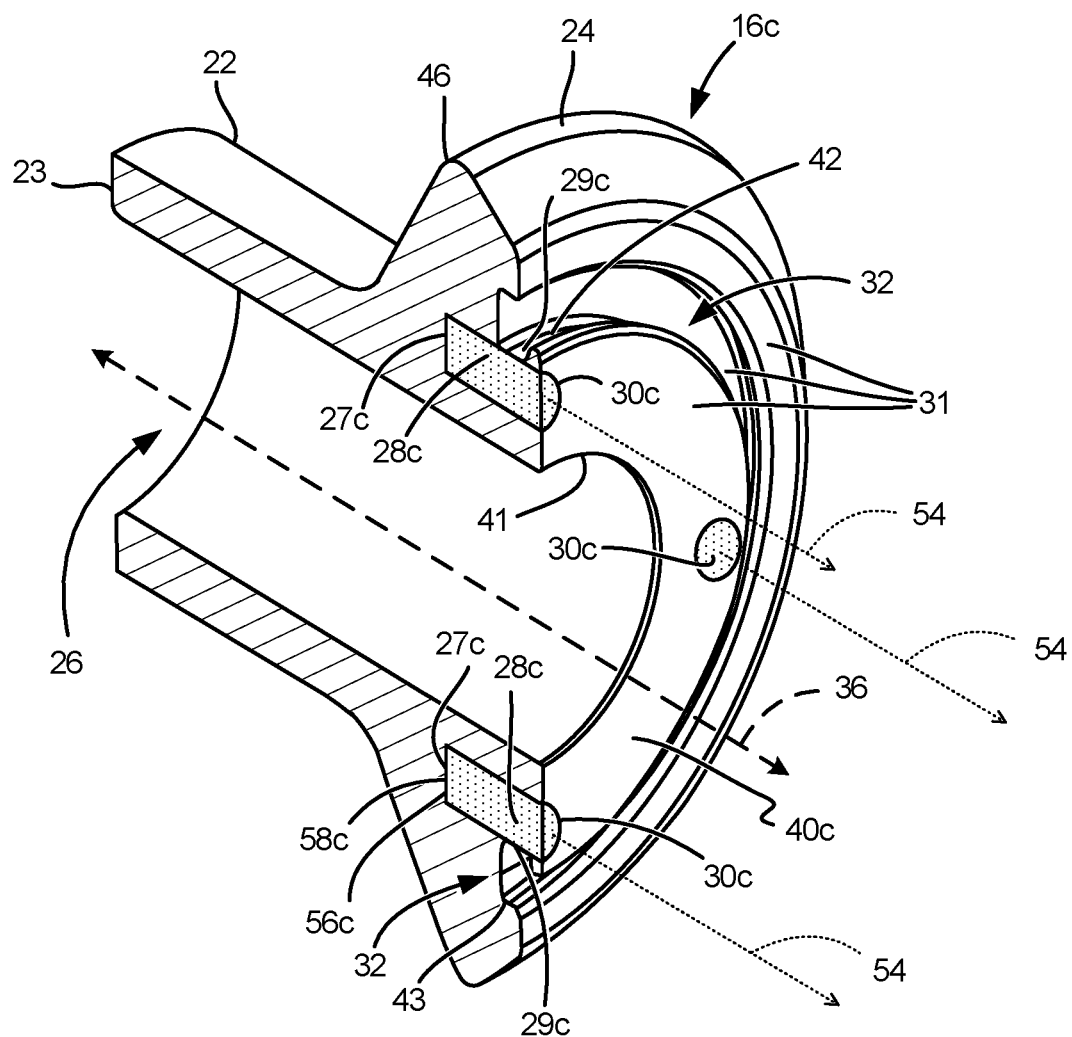
FIG. 8A is a perspective radial cross-sectional view of a third exemplary boss of the present disclosure with a third exemplary venting structure.
Figure 8B:
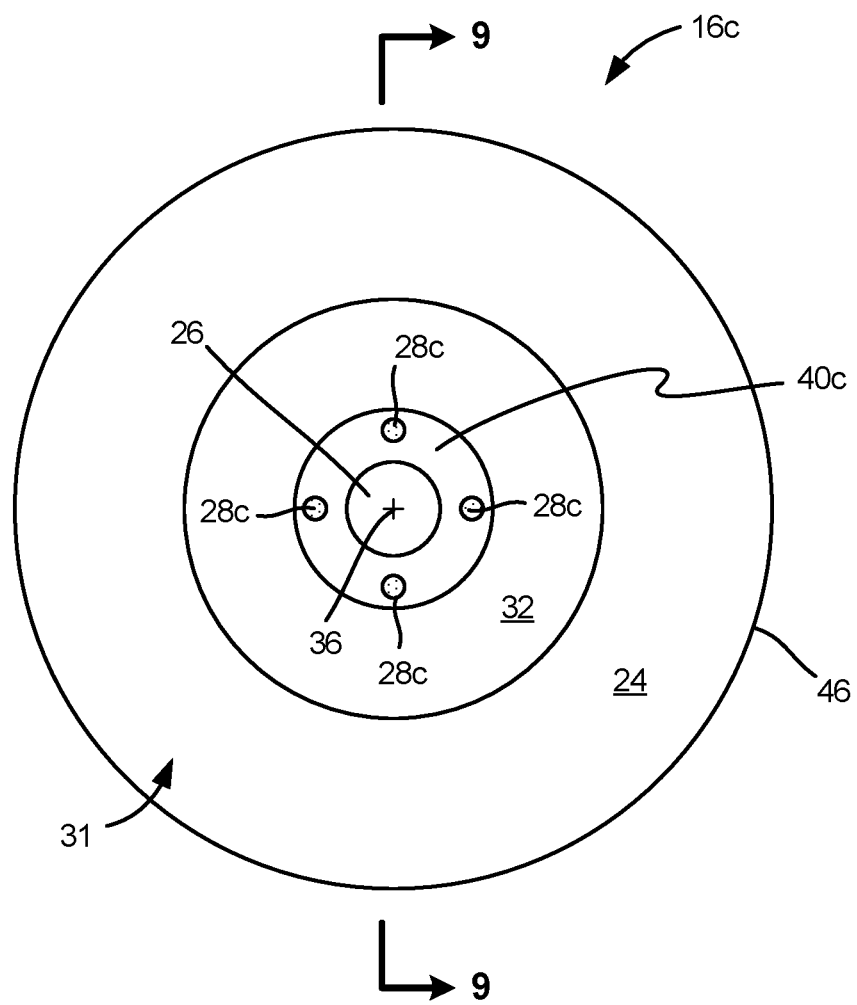
FIG. 8B is an interior view of the third exemplary boss of FIG. 8A.
Figure 9:
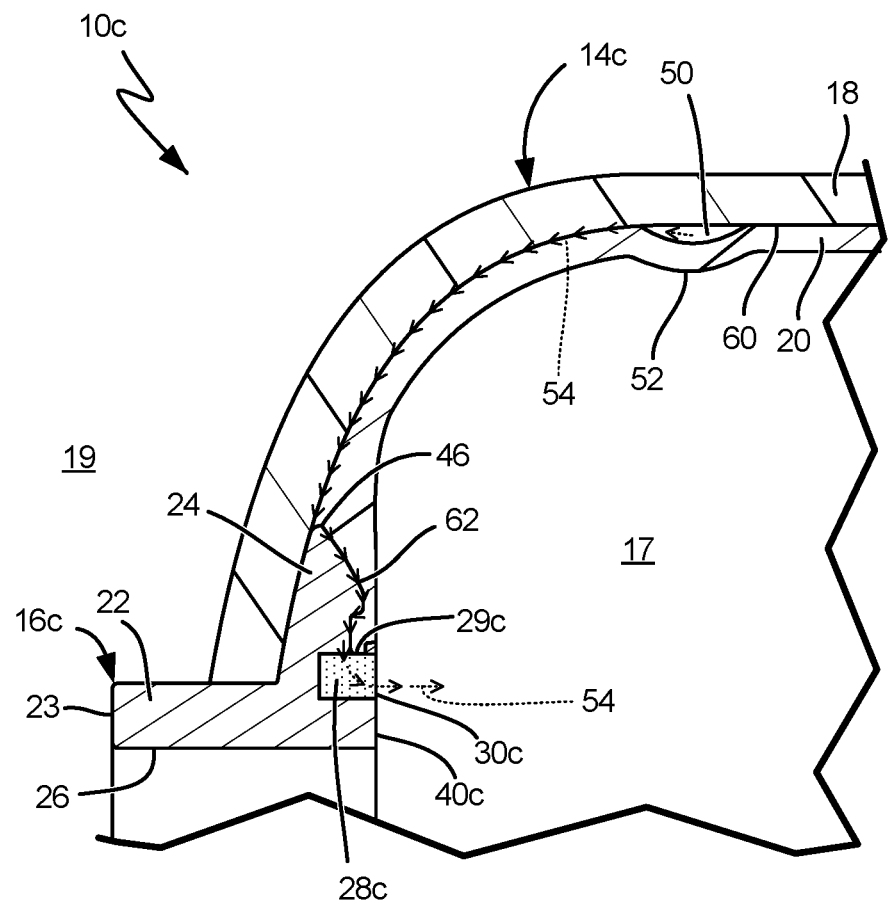
FIG. 9 is a partial vertical cross-sectional view of a top half of a pressure vessel including the boss of FIGS. 8A and 8B, taken along line 9-9 of FIG. 8B, and including a liner and shell.

FIG. 8A is a perspective radial cross-sectional view of third exemplary boss 16c with third exemplary venting structure 28c. FIG. 8B is an interior side view of third exemplary boss 16c. FIG. 9 is a perspective cross-sectional view of pressure vessel 10c including a third exemplary boss 16c, taken along line 9-9 of FIG. 8B, liner 20 and shell 18. Third exemplary boss 16c illustrated in FIG. 8A is similar to first and second exemplary bosses 16a, 16b except for structural differences due to the shape of third exemplary venting structure 28c differing from the shape of venting structures 28a, 28b. Third exemplary venting structure 28c fits into venting-structure-receiving cavity 27c of boss 16c. The third exemplary venting structure 28c is one of multiple cylindrical shaped bodies, each having at least two opposing ends and one cylindrical surface. While four venting structures 28b are shown, it is contemplated that more or fewer cylindrical shaped bodies can be used. One of the opposing ends facing the inner environment of the vessel includes interior surface 30c. The cylindrical surface includes a portion that includes liner interface surface 29c. The cavity 27c can include surface 56c. The surface 56c can be adhered to surface 58c of the third exemplary venting structure 28c by a high temperature resistant adhesive or by welding the surface 58c to the surface 56c, for example.

As shown in FIG. 9, gas in pocket 50 between liner 20 and shell 18 flows along vent path 54 to exhaust into interior environment 17. Path 54 begins at pocket 50 at interface 60 between liner 20 and shell 18 and continues to interface 62 between liner 20 and boss 16c. The gas then can travel to an interface 29c between venting structure 28c and liner 20. The gas enters channels of venting structure 28c via liner interface surface 29c and travels through the channels to an interior environment 17 of the vessel 10c.

FIG. 10 is a partial radial cross-sectional view of a top half of a pressure vessel including a fourth exemplary boss 16d of the present disclosure with a fourth exemplary venting structure 28d, liner 20d and shell 18. Fourth exemplary boss 16d is similar to first exemplary boss 16a except that fourth exemplary venting structure 28d differs from the shape of venting structures 28a; venting structure 28d wraps around groove 32 of boss 16d, including outer surface 43 of groove 32. Fourth exemplary venting structure 28d fits into venting-structure-receiving cavity 27d of boss 16d.

Fourth exemplary venting structure 28d in one embodiment is an annular structure. However, it is contemplated that the concept illustrated therein can also be applied to the multiple venting structures 28b and variations thereof. Thus, with reference to FIGS. 6A-7, it is contemplated that a variation of venting structure 28b may wrap around groove 32 of boss 16b, including outer surface 43 of groove 32.

As shown in FIG. 10, gas in pocket 50 between liner 20d and flange 24 of boss 16d exhausts to interior environment 17 by flowing along vent path 54, which begins at pocket 50 at interface 62 between liner 20d and boss 16. The gas then can travel to an interface 29d between venting structure 28d and liner 20d. The gas enters channels of venting structure 28*d* via liner interface surface 29*d* and travels through the channels to an interior environment 17 of the vessel 10*d*.

In the illustrated embodiment of pressure vessel 10*d*, liner 20*d* is formed to also abut an exterior surface of flange 24 of boss 16*d*, thereby having portion 35 on the exterior surface of the flange 24. Another vent path for gas trapped at interface 60 between liner 20 and shell 18 travels around liner portion 35 and continues to interface 62 between liner 20 and boss 16*c*. The gas then travels through the channels of venting structure 28*d* to the interior environment 17 of the vessel 10*c*.

FIG. 11 is a partial radial cross-sectional view of a top half of a pressure vessel including a fifth exemplary boss 16*e* of the present disclosure with a fifth exemplary venting structure 28*e*, liner 20*e* and shell 18. Fifth exemplary boss 16*e* is similar to third exemplary boss 16*c* except that fifth exemplary venting structure 28*e* is located in differently placed substantially cylindrical venting-structure-receiving cavities 27*e* of boss 16*e*, compared to the locations of venting-structure-receiving cavities 27*c* of boss 16*c*. In the illustrated embodiment, venting-structure-receiving cavities 27*e* of boss 16*e* are located to intercept outer surface 43 of groove 32. In an exemplary method of forming pressure vessel 10*e*, liner 20*e* may be formed around flange 24 before creating venting-structure-receiving cavities 27*e*. The cavities 27*e* in an exemplary embodiment are provided not only in boss 16*e* but in a portion of liner 20*e* as well. Accordingly, interior surface 30*e* of venting structure 28*e* is configured to be flush with inner portion surface 40*e* of flange 16*e* and in fluid communication with interior environment 17.

As shown in FIG. 11, gas in pocket 50 between liner 20*e* and flange 24 of boss 16*e* exhausts to interior environment 17 by flowing along vent path 54, which begins at pocket 50 at interface 62 between liner 20*e* and boss 16. The gas then can travel to an interface 29*e* between venting structure 28*e* and liner 20*e*. The gas enters channels of venting structure 28*e* via liner interface surface 29*e* and travels through the channels to an interior environment 17 of the vessel 10*e*.

In the illustrated embodiment of pressure vessel 10*e*, liner 20*e* is formed to also abut an exterior surface of flange 24 of boss 16*e*, thereby having portion 35 on the exterior surface of the flange 24. Another vent path for gas trapped at interface 60 between liner 20*e* and shell 18 travels around liner portion 35 and continues to interface 62 between liner 20 and boss 16*e*. The gas then travels through the channels of venting structure 28*e* to the interior environment 17 of the vessel 10*e*.

The fifth exemplary venting structure 28*e* is one of multiple cylindrical shaped bodies, each having at least two opposing ends and one cylindrical surface. While four venting structures 28*e* are contemplated (similar to the arrangement of venting structures 28*c* shown in FIG. 8B but located farther out radially from axis 36), it is to be understood that more or fewer cylindrical shaped bodies can be used. One of the opposing ends facing the inner environment 17 of the vessel includes interior surface 30*e*. The one cylindrical surface includes a portion that includes liner interface surface 29*e*.

In an exemplary embodiment, multiple bodies of an exemplary venting structure of this disclosure—whether wedge shaped, cylindrical, other another shape—can be inserted into corresponding cavities of an exemplary boss of this disclosure. While four venting structures 28*b*, 28*c*, 28*d*, 28*e* are shown in each of the respective bosses 16*b*, 16*c*, 16*d*, 16*e* it is contemplated that more or fewer can be used. Moreover, cavities 27 may be located differently than illustrated on interior surface 31 of the boss 16. Also, the cavities 27 may or may not be equally spaced apart about a circumference about port 26 of the boss 16.

Figure 12:
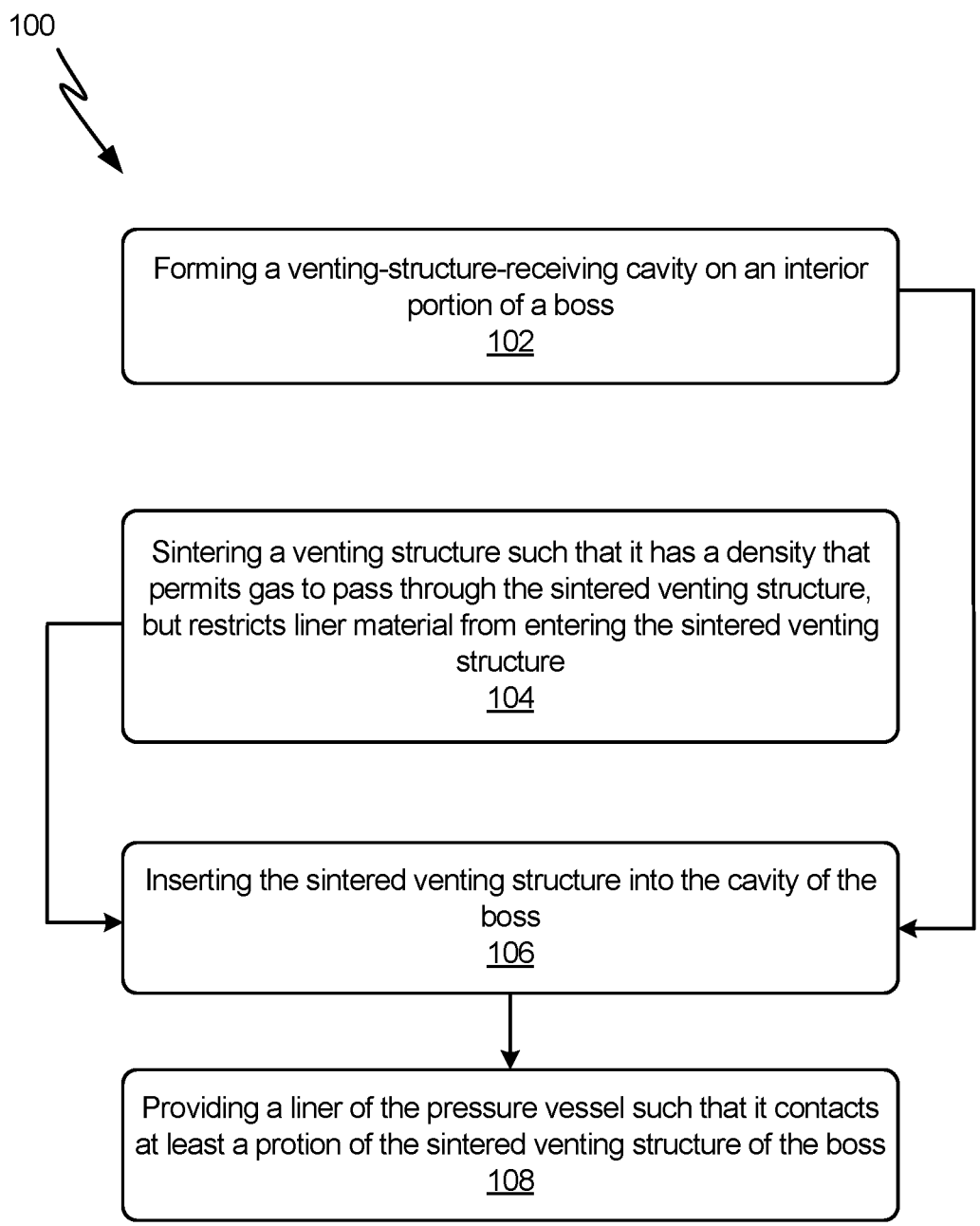
FIG. 12 illustrates an exemplary method of manufacturing a pressure vessel.

FIG. 12 illustrates an exemplary method 100 of manufacturing a pressure vessel 10. In the manufacturing of the vessel 10, manufacturing of the boss 16 may be completed separately from the manufacturing of the vessel liner 20 and shell 18. For example, a boss with a venting structure(s) 28 may be pre-fabricated prior to other steps of manufacturing a pressure vessel. In an exemplary embodiment, the manufacture of a pressure vessel 10*a*, 10*b*, 10*c*, 10*d*, 10*e* with the boss 16*a*, 16*b*, 16*c*, 16*d*, 16*e* having a venting structure 28*a*, 28*b*, 28*c*, 28*d*, 28*e* may be similar to the manufacture of a pressure vessel 10 with a conventional boss 16 not having the venting structure 28. The exemplary bosses 16*a*, 16*b*, 16*c*, 16*d*, 16*e* described herein can be pre-fabricated to be compatible with known and foreseeable processes for manufacturing pressure vessels.

An exemplary method 100 includes step 102 of forming a cavity (such as venting-structure-receiving cavity 27*a*, 27*b*, 27*c*, 27*d*, or 27*e*) on an interior side (such as including a portion of interior surface 31) of a boss 16*a*, 16*b*, 16*c*, 16*d*, 16*e*. For example, the cavity can be formed, such as by machining, at a location between edge 46 and port 26 at the interior surface 31 of the boss 16*a*, 16*b*, 16*c*, 16*d*, 16*e*. The cavity can be formed to receive a correspondingly shaped venting structure. For example, an annular cavity 27*a* may be formed for receiving an annular structure such as first exemplary venting structure 28*a*. Also or alternatively, for example, the cavity may be formed for receiving a wedge shaped structure such as second exemplary venting structure 28*b* or a cylindrical shaped structure such as exemplary venting structure 28*c*, 28*e*. Also, the cavity may be replicated along the interior end portion of the boss such that a set of cavities are circumferentially, preferably evenly, spaced apart from each other (such as shown in FIGS. 6A, 6B, 8A, and 8B).

Alternatively, in another embodiment, a portion of an interior side of a flange of a boss can be treated, such as by heat, pressure, and/or chemicals, to take on venting qualities. This can occur at a location on the interior surface 31 of the boss in lieu of forming a cavity for receiving a separate venting structure.

While particular exemplary shapes for venting structure 28 are shown in the illustrated embodiments, it is contemplated that many other configurations may also be suitable. Particularly suitable configurations provide a path from interface 62 between liner 20 and boss 16 to interior environment 17 of the pressure vessel 10. An advantage of venting to the interior environment 17 of the pressure vessel 10, rather than the exterior environment 19, is that such interior venting does not potentially create false alerts from leak detectors. In an exemplary embodiment, the exemplary venting structure 28 is configured to provide an efficient vent path 54 while maintaining the structural integrity of the boss 16. Because the material of venting structure 28 may be less dense, more porous, and not as strong as the primary material of boss 16, venting structures 28 are spaced from port 26 and/or spaced from other venting structures 28 in some embodiments. Such arrangements allow the stronger material of boss 16 to surround the venting structures 28. It is contemplated that the number, shape, and location of the venting structures 28 can be different than shown. Moreover, in the embodiments having multiple discrete venting structures 28, the illustrated embodiments show that each of the venting structures 28 of a particular boss 16 is identical to each of the other venting structures 28 in the respective boss 16. However, it is contemplated that venting structures 28 of different configurations can be used in a single boss 16 if desired.

Referring to FIG. 10, the method 100 includes step 104 of sintering a venting structure such that it has a porosity and/or density that permits gas to pass through the sintered structure, but restricts liner material from entering the sintered structure. Such sintering can occur before or after the venting structure is embedded into a corresponding cavity of the boss.

In exemplary embodiments, sintering of one of the venting structures 28 described herein can include a process of compacting metal or other material in powder form into a die, mold or cavity and forming a solid mass of material by heat and/or pressure without melting the material to the point of liquefaction. In some embodiments, the venting structure 28 can be formed in a mold shaped to complement a corresponding cavity 27, for example. In other embodiments, the cavity 27 may serve as the die into which material power is placed for sintering and thereby forming the venting structure 28 in situ in the boss 16 itself. The sintering may include using metals, ceramics, plastics, and other materials. The atoms in the materials diffuse across the boundaries of the particles, fusing the particles together and creating a solid yet porous piece. The sintering can occur under atmospheric pressure by using a protective gas, such as an endothermic gas. The sintering with metal can include subsequent reworking to produce a desired range of material properties. Changes in density, alloying, or heat treatments can alter the physical characteristics of the venting structure 28. Bronze and stainless steel are particularly suitable in applications requiring high temperature resistance.

Advantages of using powder, such as a metal power, include the benefit of being able to control levels of purity and uniformity in starting materials (which can reduce steps in the fabrication process). Benefits also including being able to control grain size of the starting material. These advantages allow for the manufacture of the venting part to control porosity of the part and the final shape of the venting structure 28. The use of powders, especially metal powders for sintering, allows for the fabrication of high-strength material that can withstand high pressures and a wide range of temperatures.

Referring back to FIG. 10, the method 100 can include a step 106 of inserting the sintered venting structure 28 into a corresponding cavity 27 of the boss, in a method where in the venting structure is not formed in situ. In an exemplary embodiment, the insertion occurs after the sintering of the venting part 28 and the forming of the cavity 27. Further, the venting structure 28 may be machined to fit into a pre-fabricated cavity 27 on the boss, or vice versa. In other words, the cavity 27 may be machined to receive a pre-fabricated venting structure 28 as well.

The method 100 also includes step 108 of providing a liner 20 for a pressure vessel such that it contacts at least a portion of the venting structure 28. In an exemplary method, boss 16a, 16b, 16c, 16d, 16e is mounted on a mandrel. Such a mandrel is typically provided with a shaped form about which the liner 20 is manufactured. The molten liner material may be applied to and shaped over the form. After the liner material is placed, it is cured, such as by cooling in some embodiments. The liner 20 along with the shell 18 secures the boss 16a, 16b, 16c, 16d, 16e on the vessel 10a, 10b, 10c. By providing a sintered venting part 28 prior to forming the liner 20, gas trapped between the liner 20, the shell 18, and/or the boss 16a, 16b, 16c, 16d, 16e during the manufacturing of the vessel 10a, 10b, 10c can escape via the venting structure 28 into an interior environment 17 of the vessel.

Although the subject of this disclosure has been described with reference to several embodiments, workers skilled in the art will recognize that changes may be made in form and detail without departing from the scope of the disclosure. In addition, any feature or description disclosed with respect to one embodiment is applicable to and may be incorporated in another embodiment, and vice-versa.

What is claimed is:

1. A pressure vessel having an interior environment, wherein an exterior environment is defined outside the pressure vessel, the pressure vessel including:
   a shell;
   a liner positioned within the shell and defining the interior environment;
   a boss located at a first interface between the shell and the liner, the boss including:
      a cavity at a second interface between the liner and the boss, wherein:
         the cavity is located at an interior surface of the boss in communication with the interior environment; and
         the cavity does not extend to an exterior surface of the boss in fluid communication with the exterior environment; and
      a venting structure located in the cavity, wherein a gas vent path is defined from the first interface, through the venting structure, and into the interior environment of the pressure vessel.

2. The pressure vessel of claim 1, wherein the venting structure includes a sintered metal.

3. The pressure vessel of claim 1, wherein the venting structure has a porosity that allows gas to pass through the venting structure while inhibiting material of the liner from entering the venting structure.

4. The pressure vessel of claim 1, wherein the venting structure has an annular shape.

5. The pressure vessel of claim 4, wherein the cavity includes a complementary annular shape corresponding to the annular shape of the venting structure.

6. The pressure vessel of claim 1, wherein the venting structure is one of a set of venting structures.

7. The pressure vessel of claim 6, wherein the cavity is one of a set of cavities, and wherein each cavity of the set of cavities is configured to correspond to a shape of one of the venting structures of the set of the venting structures.

8. The pressure vessel of claim 7, wherein the cavities of the set of cavities are circumferentially spaced apart from each other equally.

9. A boss for a pressure vessel, including:
   a port configured to permit fluid communication between an exterior environment of the pressure vessel and an interior environment of the pressure vessel;
   a flange extending radially outward from the port, the flange including an exterior side and an interior side;
   a cavity located on the interior side of the flange, wherein the cavity does not extend to an exterior surface of the boss in fluid communication with the exterior environment; and
   a gas venting structure located in the cavity.

10. The boss of claim 9, wherein the gas venting structure includes a sintered metal.

11. The boss of claim 9, wherein the gas venting structure has a porosity that allows gas to pass through the gas venting structure while inhibiting molten polymer material from entering the gas venting structure.

12. The boss of claim 9, wherein the gas venting structure has an annular shape.

13. The boss of claim 12, wherein the cavity includes a complementary annular shape corresponding to the annular shape of the gas venting structure.

14. The boss of claim 9, wherein the venting structure is one of a set of venting structures.

15. The boss of claim 14, wherein the cavity is one of a set of cavities, and wherein each cavity of the set of cavities is configured to correspond to a shape of one of the venting structures of the set of the venting structures.

16. The boss of claim 15, wherein the cavities of the set of cavities are circumferentially spaced apart from each other equally.

\* \* \* \* \*